(12) United States Patent
Lee

(10) Patent No.: US 10,017,635 B2
(45) Date of Patent: Jul. 10, 2018

(54) THERMOPLASTIC RESIN COMPOSITION AND PRODUCT FORMED THEREFROM

(71) Applicant: Chi Mei Corporation, Tainan (TW)

(72) Inventor: Chih-Cheng Lee, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 44 days.

(21) Appl. No.: 15/390,835

(22) Filed: Dec. 27, 2016

(65) Prior Publication Data

US 2017/0190894 A1 Jul. 6, 2017

(30) Foreign Application Priority Data

Dec. 31, 2015 (TW) .............................. 104144658 A

(51) Int. Cl.
| | | |
|---|---|---|
| C08L 25/12 | (2006.01) | |
| C08K 13/00 | (2006.01) | |
| C08L 55/02 | (2006.01) | |
| C08L 83/04 | (2006.01) | |
| C08K 5/103 | (2006.01) | |
| C08K 5/20 | (2006.01) | |
| C08L 51/04 | (2006.01) | |

(52) U.S. Cl.
CPC .............. *C08L 25/12* (2013.01); *C08K 13/00* (2013.01); *C08L 55/02* (2013.01); *C08L 83/04* (2013.01); *C08K 5/103* (2013.01); *C08K 5/20* (2013.01); *C08L 51/04* (2013.01); *C08L 2205/06* (2013.01)

(58) Field of Classification Search
CPC .............................. C08L 25/12; C08L 2205/06
USPC ........................................................ 524/210
See application file for complete search history.

(56) References Cited

U.S. PATENT DOCUMENTS

| 6,774,166 B1 | 8/2004 | Eichenauer et al. |
| 2002/0082326 A1 | 6/2002 | Siebourg et al. |
| 2012/0142862 A1* | 6/2012 | Wu ........................ C08F 279/02 525/73 |

FOREIGN PATENT DOCUMENTS

| CN | 104558443 | * | 4/2015 |
| CN | 104558443 A | | 4/2015 |
| DE | 19926622 A1 | | 12/2000 |
| JP | 2004510004 A | | 4/2004 |

OTHER PUBLICATIONS

EP Search Report dated Apr. 18, 2017 in European application (No. 16207312.6-1308).
TIPO Office Action dated Jul. 12, 2016 in corresponding Taiwan (application No. 104144658).
TIPO Office Action dated Nov. 16, 2016 in corresponding Taiwan (application No. 104144658).

* cited by examiner

*Primary Examiner* — Deve E Valdez
(74) *Attorney, Agent, or Firm* — McClure, Qualey & Rodack, LLP

(57) ABSTRACT

A thermoplastic resin composition includes a rubber-modified polystyrene-based resin, a pentaerythritol ester compound and a fatty acid amide compound, wherein a total content of the pentaerythritol ester compound and the fatty acid amide compound is ranging from 4 parts to 8 parts by weight based on 100 parts by weight of the rubber-modified polystyrene-based resin, and a ratio of a content of the pentaerythritol ester compound to the total content of the pentaerythritol ester compound and the fatty acid amide compound is in a range of larger than 0.2 to less than 0.83.

17 Claims, No Drawings

THERMOPLASTIC RESIN COMPOSITION AND PRODUCT FORMED THEREFROM

This application claims the benefit of Taiwan application Serial No. 104144658, filed Dec. 31, 2015, the subject matter of which is incorporated herein by reference.

BACKGROUND

Field of the Invention

The disclosure relates in general to a thermoplastic resin composition, more particularly to a thermoplastic resin composition with good physical properties.

Description of the Related Art

An impact-resist styrene-based resin composition formed by dispersing the rubber-containing graft copolymer in the styrene-based copolymer can be used to make a product with high impact strength. The resin composition has to go through several processing steps and mouldings (such as the primary processing including the injection moulding and the extrusion moulding, and the secondary processing such as the vacuum moulding) before obtaining a final product. Since the processing plants pay more attention to the easy-processing resin and the product with well physical properties and high impact strength, it is an important issue to be solved to develop a styrene based resin composition having physical properties in balance and also suitable for being widely applied to form various products.

Without sacrificing the physical properties of the product, it is known that small amounts of a slip agent (as a processing aid during molding) added into the rubber-modified polystyrene-based resin can enhance the flowability of the molding product in the processing, thereby improving the processability of the resin mold. Pentaerythritoltetrastearate is typically added in the rubber-modified polystyrene-based resin as the slip agent, and it does have effect on the processability of the resin; however, pentaerythritoltetrastearate would also lead to the resin residuals at the inlet gate of mold (ex: drawing phenomenon appears when the inlet port is away from to the inlet gate of mold), thereby forming the high gate scar of resin correspondingly. It requires one more extra step to remove the resin residuals. Alternatively, N,N'-ethylene bisstearamide is also one of the slip agents commonly used in the resin. Although adding N,N'-ethylene bisstearamide in the rubber-modified polystyrene-based resin does improve the processability of the resin, it leads to the poor demoulding of the resin. If the injection pressure of the injector for pumping the resin is not under a well-controlled, it would be easy to induce whitening portions at the surface of the product during demoulding, which restricts the processing range of the demoulding (i.e. small workable range).

Thus, it is one of important goals for the manufactures to develop a styrene based resin composition having physical properties such as good processing property and good demoulding property in balance.

SUMMARY

The disclosure relates to a thermoplastic resin composition having good physical properties, such as good processing property and good demoulding property, and smooth gate scar during molding for making the product.

According to the present disclosure, a thermoplastic resin composition is provided, comprising a rubber-modified polystyrene-based resin, a pentaerythritol ester compound and a fatty acid amide compound, wherein a total content of the pentaerythritol ester compound and the fatty acid amide compound is ranging from 4 parts to 8 parts by weight based on 100 parts by weight of the rubber-modified polystyrene-based resin, and a ratio of a content of the pentaerythritol ester compound to the total content of the pentaerythritol ester compound and the fatty acid amide compound is in a range of larger than 0.2 to less than 0.83.

According to the present disclosure, a product formed from the aforementioned thermoplastic resin composition is provided.

The disclosure will become apparent from the following detailed description of the preferred but non-limiting embodiments. The following description is made with reference to the accompanying drawings.

BRIEF DESCRIPTION OF THE DRAWINGS

None.

DETAILED DESCRIPTION

The embodiment of the present disclosure disclosed below provides the thermoplastic resin compositions having physical properties in balance, such as good processing property, good demoulding property and smooth gate scar formed during molding, so that the thermoplastic resin compositions of the embodiment can be widely applied for making different products.

According to one embodiment, a thermoplastic resin composition includes a rubber-modified polystyrene-based resin, a pentaerythritol ester compound and a fatty acid amide compound, wherein a total content of the pentaerythritol ester compound and the fatty acid amide compound is ranging from 4 parts to 8 parts by weight based on 100 parts by weight of the rubber-modified polystyrene-based resin, and a ratio of a content of the pentaerythritol ester compound to the total content of the pentaerythritol ester compound and the fatty acid amide compound is in a range of larger than 0.2 to less than 0.83.

In a further embodiment, for the thermoplastic resin composition as described above, the content of the pentaerythritol ester compound is ranging from 2 parts to 4 parts by weight and a content of the fatty acid amide compound is ranging from 1 part to 4 parts by weight, based on 100 parts by weight of the rubber-modified polystyrene-based resin.

Embodiments for describing related components and applicable preparing methods are provided hereinafter. However, the present disclosure is not limited thereto. It is noted that not all embodiments of the invention are provided herein. Modifications and variations can be made without departing from the spirit of the disclosure to meet the requirements of the practical applications. There may be other embodiments of the present disclosure which are not specifically illustrated but applicable. Thus, the specification is to be regard as an illustrative sense rather than a restrictive sense.

<Rubber-Modified Polystyrene-Based Resin>

In one embodiment, the rubber-modified polystyrene-based resin comprises 10 wt % to 30 wt % of graft copolymer and 70 wt % to 90 wt % of styrene-vinyl cyanide based copolymer, wherein the graft copolymer comprises diene-based rubber with grafted chains of styrene based monomeric unit and vinyl cyanide based monomeric unit.

Graft copolymer and preparation therefor are described below.

In one embodiment, the graft copolymer is diene-based rubber with grafted chains of the styrene based monomer and the vinyl cyanide based monomer, and the graft copolymer has a weight average particle size ranging from 0.05 µm to 0.8 µm (if the weight average particle size of the graft copolymer is less than 0.05 µm, resin with high-impact strength could not be obtained; if the weight average particle size of the graft copolymer is larger than 0.8 µm, the gloss of the resin would be reduced).

In one embodiment, the graft copolymer comprises 40 wt % to 60 wt % of first graft copolymer and 40 wt % to 60 wt % of second graft copolymer. In one embodiment, the graft copolymer comprises the first graft copolymer with particle sizes of 0.05 µm to 0.15 µm and the second graft copolymer with particle sizes of 0.25 µm to 0.4 µm.

Diene-Based Rubber

The diene-based rubber described above could be a polymer formed from the polymerization process of the butadiene monomer, the isoprene monomer, the chloro pentadienyl monomer, or any two or more of those monomers thereof. Among the examples of the monomers, the butadiene monomer is preferable. Alternatively, the diene-based rubber described above could be a polymer formed from the polymerization process of the monomers as described above and other vinyl group monomer such as the butadiene-styrene copolymer, the butadiene-styrene based copolymer such as the butadiene-ethenylmethyl-benzen copolymer and the like; the butadiene-acrylonitrile copolymer, the butadiene-vinyl cyanide copolymer such as the butadiene-methacrylonitrile copolymer and the like; the butadiene-methacrylate copolymer, the butadiene-ethylacrylate copolymer, the butadiene-butylacrylate copolymer, the butadiene-2-ethylacrylate copolymer, the butadiene-methyl methacrylate copolymer, the butadiene-(methyl) acrylate copolymer such as the butadiene-methyl ethylacrylate copolymer and the like, and the tercopolymer containing at least 50 wt % or more of butadiene.

The diene-based rubber could be directly polymerized from the monomers as described above to have a weight average particle size ranging from 0.05 µm to 0.8 µm by an emulsion polymerization method. Alternatively, the diene-based rubber having a weight average particle size ranging from 0.05 µm to 0.18 µm could be prepared first, and it is then subjected to a rubber agglomerating method to have a weight average particle size ranging from 0.2 µm to 0.8 µm. If the average particle size of the graft copolymer is less than 0.05 µm, resin with high-impact strength could not be obtained. If the average particle size of the graft copolymer is larger than 0.8 µm, the gloss of the resin would be reduced.

Examples of the rubber agglomerating method include a freezing agglomerating method, a chemical agglomerating method, and a mechanical stirring agglomerating method. The chemical agglomerating method is achieved by adding an agent including (but not limited to) (1) acidic material, such as acetic anhydride, hydrogen chloride, or sulfuric acid; (2) a metal salt, such as sodium chloride, potassium chloride, or calcium chloride; (3) a carboxylic acid group-containing polymeric agglomerating agent, such as (meth)acrylic acid-(meth)acrylate copolymer (for example, methacrylic acid-butyl acrylate copolymer, and methacrylic acid-ethyl acrylate copolymer).

Styrene Based Monomer

In one embodiment, examples of the styrene based monomer of the graft copolymer described above include styrene, α-methylstyrene, α-chlorostyrene, 4-tert-butylstyrene, p-methylstyrene, o-methylstyrene, m-methylstyrene, 2,4-dimethylstyrene, ethylstyrene, α-methyl-p-methylstyrene, and bromostyrene. Among the examples of the styrene based monomer, the preferable styrene based monomer is selected from a group consisting of styrene, α-methylstyrene, or a combination thereof.

Vinyl Cyanide Based Monomer

In one embodiment, examples of the vinyl cyanide based monomer of the graft copolymer described above include acrylonitrile, α-methylacrylonitrile, methacrylonitrile, malononitrile, and 1,2-dicyanoethylene. Among the examples of the vinyl cyanide based monomer, acrylonitrile is preferable.

<Preparation of Graft Copolymer>

Preparation of the graft copolymer according to one embodiment is provided below. A diene-based rubber is prepared by emulsion polymerization using the butadiene monomer, followed by a treatment of a rubber agglomerating method to obtain a diene-based rubber with a weight average particle size ranging from 0.05 µm to 0.8 µm.

In one embodiment, the emulsion graft copolymerization is conducted at a temperature lower than 90° C. In another embodiment, the emulsion graft copolymerization is preferably conducted at a temperature ranging from 10° C. to 80° C.

Grafting ratio of the graft copolymer can be controlled by adjusting the factors of polymerization process, such as the polymerization temperature, the chemical properties of the rubbery copolymer, particle sizes, adding rate of the monomer, the initiator, the chain-transfer agent, and the amount and kind of the emulsifying agent.

In one embodiment, the initiator added in the polymerization process could be any of known initiators used in the free radical emulsion polymerization. Examples of the initiator include the organic hydrogen peroxides such as diisopropyl benzene hydroperoxide and cumene hydroperoxide; the peroxides such as dibenzoyl peroxide and tert-butyl peroxide; and the persulfate such as potassium persulfate. Among the examples of the initiator, organic hydrogen peroxide is preferable.

Also, the initiator can be added at a time, or added continuously without or with increasing amounts.

In one embodiment, if a total amount of the styrene based monomer and the vinyl cyanide based monomer is determined as 100 parts by weight, a content of the initiator can be ranged from 0.01 parts to 5.0 parts by weight, and preferably from 0.1 parts to 3.0 parts by weight. Moreover, the initiator can be added with increasing amounts, which facilitates the graft copolymerization.

Also, a chain transfer agent could be optionally added for the aforesaid emulsion polymerization, which has effect on the grafting ratio of the graft copolymer. Suitable examples of the chain transfer agent include, but are not limited to, n-dodecyl mercaptan (NDM), t-dodecyl mercaptan (TDM), n-butyl mercaptan, n-octyl mercaptan, and the like. Examples of the chain transfer agent may be used alone or in combinations thereof.

In one embodiment, if a total amount of the styrene based monomer and the vinyl cyanide based monomer is determined as 100 parts by weight, a content of the chain transfer agent can be ranged from 0.05 parts to 5 parts by weight, and preferably from 0.1 parts to 1.0 part by weight.

In one embodiment, after the emulsion graft copolymerization, the emulsion is further processed by coagulating with suitable coagulating agent. Examples of the typically known coagulating agent include acids such as sulfuric acid and acetic acid, and alkaline earth group metal salts such as calcium chloride, magnesium chloride, magnesium sulfate and aluminum sulfate. Among the examples of the coagulating agent, the alkaline earth group metal salts are preferable. After the coagulation is completed, the emulsion is further dehydrated to reduce water contained therein, and then dried to remove residual moisture so as to produce a powdery graft copolymer.

In one embodiment, if a total amount of the graft copolymer is determined as 100 parts by weight, a content of the coagulating agent can be ranged from 0.5 parts to 5.0 parts by weight, and preferably from 1.0 parts to 3.0 part by weight.

According to the descriptions herein, a grafting ratio means a ratio of a total weight percentage of the grafting monomers including the styrene based monomer and the vinyl cyanide based monomer to a weight percentage of the rubber. In one embodiment, the copolymer grafted on the rigid-portion of the rubber has a number average molecular weight (Mn) ranging from 10000 to 20000, and preferably ranging from 12000 to 18000. The grafting ratio is in a range of 10% to 40%, and preferably in a range of 15% to 30%. Also, "the grafting ratio" described herein means a ratio of a total weight percentage of the grafting monomeric units including the styrene based monomeric units and the vinyl cyanide based monomeric units to a weight percentage of the diene-based rubber. For example, 100% of grafting ratio means that a total weight percentage of the grafting monomeric units on the diene-based rubber to a weight percentage of the diene-based rubber will be 1:1. A resin with high impact strength, good gloss and well processing property can be produced by using the graft copolymers of the embodiments having those physical properties.

Styrene-Vinyl Cyanide Based Copolymer

In one embodiment, a styrene-vinyl cyanide based copolymer comprises 67 wt % to 80 wt % of styrene based monomeric unit, 20 wt % to 33 wt % of vinyl cyanide based monomeric unit, and 0 wt % to 13 wt % of other copolymerizable vinyl based monomeric unit. One of the methods for preparing the styrene-vinyl cyanide based copolymer is copolymerization of the styrene based monomer, the vinyl cyanide based monomer and the other copolymerizable vinyl based monomer. In the embodiment, a copolymerization of the styrene based monomer and the vinyl cyanide based monomer (and the copolymer is denoted as "a styrene-vinyl cyanide based copolymer" herein) is exemplified for illustration, wherein a weight percentage of the styrene based monomeric units is about 67 wt % to 80 wt % of the styrene-vinyl cyanide based copolymer.

In one embodiment, the styrene-vinyl cyanide based copolymer comprises 20 wt % to 50 wt % of the first styrene-vinyl cyanide based copolymer and 50 wt % to 80 wt % of the second styrene-vinyl cyanide based copolymer. The styrene-vinyl cyanide based copolymer includes two styrene-vinyl cyanide based copolymers (i.e. the first styrene-vinyl cyanide based copolymer and the second styrene-vinyl cyanide based copolymer) with different numbers of the styrene based monomeric units and/or different numbers of the vinyl cyanide based monomeric units. For example, a content of vinyl cyanide based monomeric unit of the first styrene-vinyl cyanide based copolymer is smaller than a content of vinyl cyanide based monomeric units of the second styrene-vinyl cyanide based copolymer.

In one embodiment, the aforesaid first styrene-vinyl cyanide based copolymer comprises 75 wt % to 80 wt % of styrene based monomeric units, 20 wt % to 25 wt % of vinyl cyanide based monomeric units, and 0 wt % to 5 wt % of other copolymerizable vinyl based monomeric units. The aforesaid second styrene-vinyl cyanide based copolymer comprises 70 wt % to 74 wt % of styrene based monomeric units, 26 wt % to 30 wt % of vinyl cyanide based monomeric units, and 0 wt % to 4 wt % of other copolymerizable vinyl based monomeric units. Preferably, the styrene-vinyl cyanide based copolymer comprises the first styrene-vinyl cyanide based copolymer and the second styrene-vinyl cyanide based copolymer, wherein the vinyl cyanide based monomeric units of the first styrene-vinyl cyanide based copolymer are 20 wt % to 25 wt % of the first styrene-vinyl cyanide based copolymer; and the vinyl cyanide based monomeric units of the second styrene-vinyl cyanide based copolymer are more than 25 wt % of the second styrene-vinyl cyanide based copolymer but no more than (i.e. equal to or less than) 33 wt % of the second styrene-vinyl cyanide based copolymer. That is, the styrene based monomeric units of the first styrene-vinyl cyanide based copolymer are 75 wt % to 80 wt % of the first styrene-vinyl cyanide based copolymer; and the styrene based monomeric units of the second styrene-vinyl cyanide based copolymer are more than 67 wt % of the second styrene-vinyl cyanide based copolymer but no more than (i.e. equal to or less than) 74 wt % of the second styrene-vinyl cyanide based copolymer. Preferably, a styrene-vinyl cyanide based copolymer comprises the first styrene-vinyl cyanide based copolymer having 20 wt % to 25 wt % of the vinyl cyanide based monomeric units and the second styrene-vinyl cyanide based copolymer having 26 wt % to 30 wt % of the vinyl cyanide based monomeric units; that is, the second styrene-vinyl cyanide based copolymer contains 70 wt % to 74 wt % of the styrene based monomeric units.

In one embodiment, the other copolymerizable vinyl based monomeric units of the styrene-vinyl cyanide based copolymer as mentioned above could be selected from other copolymerizable vinyl based monomers. The other copolymerizable vinyl based monomers may be used alone or in combinations thereof. Examples of the other copolymerizable vinyl based monomer include, but not limited to, (meth)acrylic based monomers and (meth)acrylate based monomers.

(Meth)Acrylic Based Monomer

In one embodiment, examples of the aforesaid (meth)acrylic based monomer include, but not limited to, acrylic acid and methacrylic acid.

(Meth)Acrylate Based Monomer

In one embodiment, examples of the aforesaid (meth)acrylate based monomer include: (meth)methyl acrylate, (meth)ethyl acrylate, (meth)propyl acrylate, (meth)butyl acrylate, (meth)benzyl acrylate, (meth)hexyl acrylate, (meth)cyclohexyl acrylate, (meth)dodecyl acrylate, (meth)2-hydroxyethyl acrylate, (meth)glycidyl acrylate, γ-(meth)acryl hydroxy-propyl tri-methoxy silane and (meth)dimethylaminoethyl acrylate. Among those examples of the (meth)acrylate based monomer, the (meth)methyl acrylate is preferable.

In one embodiment, the styrene-vinyl cyanide based copolymer has a molecular weight ranging from 100000 to 150000, wherein the styrene based monomeric units and the vinyl cyanide based monomeric units can be the monomers used in the graft copolymer as described above.

<Pentaerythritol Ester Compound>

According to the embodiments, the pentaerythritol ester compound of the thermoplastic resin composition can be an ester compound formed by reacting pentaerythritol with the carboxylic acid compound. Examples of the carboxylic acid compound include lauric acid, palmitic acid, stearic acid, arachidonic acid, behenic acid, lignocericacid, cerotic acid, montanic acid, oleic acid, elaidic acid, erucic acid, linoleic acid, linolenic acid, oxalicacid, malonic acid, succinicacid, glutaric acid, adipic acid, pimelic acid, suberic acid, azelaic acid, sebacic acid, nonane dicarboxylicacid, decane dicarboxylic acid, undecane dicarboxylic acid, dodecanedicarboxylic acid, eicosane dicarboxylicacid, maleic acid, fumaric acid, citraconic acid, mesaconicacid, itconic acid, cycloproanedicarboxylic acid, cyclobutane dicarboxylicacid, cyclopentadiane dicarboxylic acid, camphor acid, hexahydrophthalicacid, phthalic acid, terephthalicacid, isophthalic acid, naphthalicacid and diphenyl-o,o'-dicarboxyl acid. The carboxylic acid compound described above can be used alone or in combinations of two or more.

Examples of the pentaerythritol ester compound of the thermoplastic resin composition according to the embodiment include pentaerythritoltristearate, pentaerythritoladipate stearate, pentaerythritol succinate stearate, pentaerythritoltetrastearate (PETS) and pentaerythritoltetralaurate. Preferably, the pentaerythritol ester compound is PETS. The pentaerythritol ester compound can be prepared by esterification reaction, and the catalyst for esterification reaction such as organic tin compound can be added. The amounts of the alcohols and the carboxylic acid compound in the reaction are determined and adjusted according to different kinds of reactants in use and stoichiometry.

In one embodiment, if a total amount of the rubber-modified polystyrene-based resin is determined as 100 parts by weight, a content of the pentaerythritol ester compound is in a range from 2 parts to 4 parts by weight.

It has no particular limitations for selection of the pentaerythritol ester compound and the way for adding the pentaerythritol ester compound in the embodiment. The pentaerythritol ester compound can be added during or after polymerization of the polystyrene-based resin. Also, the pentaerythritol ester compound can be added from an extruder or a static mixer.

<Fatty Acid Amide Compound>

According to the embodiment, a fatty acid amide compound of the thermoplastic resin composition can be the compound having more than one acid-amide bond, which contains 12 to 150 carbon atoms. Examples of the fatty acid amide compound include stearamide, oleamide, erucamide, N,N'-ethylene bisstearamide (EBA), N,N'-Methylenebisoctadecanamide and N,N'-ethylenebisoleamide (EBO). Preferably, the fatty acid amide compound is N,N'-ethylene bisstearamide (EBA).

In one embodiment, if a total amount of the rubber-modified polystyrene-based resin is determined as 100 parts by weight, a content of the fatty acid amide compound is in a range from 1 part to 4 parts by weight.

It has no particular limitations for the aforesaid pentaerythritol ester compound and the way for adding the pentaerythritol ester compound in the embodiment. The pentaerythritol ester compound can be added during or after polymerization of the polystyrene-based resin; and it can be added from an extruder or a static mixer.

Additionally, the thermoplastic resin composition of the embodiment may further comprise polysiloxane, such as silicon oil, organic cyclosiloxane, silicon rubber, silicon resin and the like.

In one embodiment, polysiloxane can be represented by the following chemical formula:

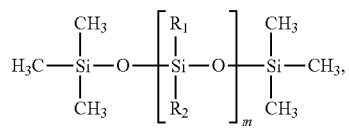

wherein R1 and R2 can be the same or different and are selected from an alkyl group containing 1-6 carbon atoms (C1-C6), a phenyl group, and a C6-C20 phenyl group substituted with one or more alkyl groups, and hydrogen. Also, m is in a range of about 2000 to 11,000.

In some of examples, R1 can be a methyl group or a phenyl group, and R2 can be a methyl group, a phenyl group or hydrogen.

In one embodiment, the aforesaid polysiloxane is silicon oil having a viscosity in a range of 5000 cSt to 15000 cSt at 25° C. When the viscosity of silicon oil is less than 5000 cSt, the silicon oil contaminates the surface of the mold since the rubber-modified polystyrene-based resin would have a tendency to separate from polysiloxane, thereby producing the poor-appearance products, such as the products with yellowish appearance.

In one embodiment, the polysiloxane can be polydimethylsiloxane (PDMS). In another embodiment, a mixture containing polydimethylsiloxane (PDMS) with an average molecular weight of 200,000-800,000 can be used.

The following examples are provided for illustrating preparation of a thermoplastic resin composition according to one of the embodiments, including the details for preparing the graft copolymer and the styrene-vinyl cyanide based copolymer. However, these should not be construed as limiting the scope of the invention.

<Preparation of Graft Copolymer>

Steps for preparing the graft copolymer (including the first and second graft copolymers) are described below.

First Graft Copolymer (B-1)

(1) 95 parts by weight of 1,3-butadiene, 5.0 parts by weight of vinyl cyanide, 15 parts by weight of potassium persulfate solution (concentration of 1 wt %), 2.3 parts by weight of rosin soap (as an emulsifier), 140.0 parts by weight of distilled water and 0.2 part by weight of tert-dodecanethiol (as a chain transfer agent) were mixed and allowed to conduct a polymerization reaction at 65° C. for 12 hours. After polymerization reaction, a diene-based rubber emulsion with diene rubber particles having a solid content of 40% and an average particle size of 0.1 µm is obtained. The conversion rate of the polymerization reaction was 94%.

(2) 100 parts by weight of the diene-based rubber emulsion (dry weight) having an average particle size of 0.1 µm, 25 parts by weight of styrene, 8.3 parts by weight of vinyl cyanide, 0.2 part by weight of tert-dodecanethiol, 0.5 part by weight of cumyl hydroperoxide, 3.0 parts by weight of ferrous sulfate solution (concentration of 0.2 wt %), 3.0 parts by weight of sodium formaldehyde sulfoxylate solution (concentration of 10 wt %), 20.0 parts by weight of ethylenediaminetetraacetic acid solution (concentration of 0.25 wt %) and 200.0 parts by weight of distilled water were mixed and allowed to conduct a polymerization reaction. The styrene and the vinyl cyanide were added continuously during a time period of 5 hours so as to obtain a rubber emulsion (average particle size of 0.1 µm) of the first graft copolymer of the embodiment.

Second Graft Copolymer (B-2)

(1) 95 parts by weight of 1,3-butadiene, 5.0 parts by weight of vinyl cyanide, 15 parts by weight of potassium persulfate solution (concentration of 1 wt %), 2.3 parts by weight of rosin soap (as an emulsifier), 140.0 parts by weight of distilled water and 0.2 part by weight of tert-dodecanethiol (as a chain transfer agent) were mixed and allowed to conduct a polymerization reaction at 65° C. for 12 hours. After polymerization reaction, a diene-based rubber emulsion with diene rubber particles having a solid content of 40% and an average particle size of 0.1 μm is obtained. The conversion rate of the polymerization reaction was 94%.

(2) 100 parts by weight of the diene-based rubber emulsion (dry weight) is then agglomerated to have an average particle size of 0.3 μm by using 3.3 parts by weight of the polymer coagulant (dry weight), so as to obtain a diene-based rubber emulsion with agglomerated particles.

(3) 100 parts by weight of the diene-based rubber emulsion (dry weight) having the average particle size of 0.3 μm, 25 parts by weight of styrene, 8.3 parts by weight of vinyl cyanide, 0.2 part by weight of tert-dodecanethiol, 0.5 part by weight of cumyl hydroperoxide, 3.0 parts by weight of ferrous sulfate solution (concentration of 0.2 wt %), 3.0 parts by weight of sodium formaldehyde sulfoxylate solution (concentration of 10 wt %), 20.0 parts by weight of ethylenediaminetetraacetic acid solution (concentration of 0.25 wt %), 1.1 parts by weight of rosin soap and 200.0 parts by weight of distilled water were mixed and allowed to conduct a polymerization reaction. The styrene and the vinyl cyanide were added continuously during a time period of 5 hours so as to obtain a rubber emulsion (average particle size of 0.3 μm) of the second graft copolymer of the embodiment.

Subsequently, the rubber emulsion of the first graft copolymer (B-1) and the rubber emulsion of the second graft copolymer (B-2) were mixed with a ratio of 1:1, and the mixture is then condensed by calcium chloride ($CaCl_2$), followed by dehydrating and drying to have a moisture content lower than 2%, so as to obtain the graft copolymer of the embodiment (containing diene-based rubber of 63 wt %).

<Preparation of Styrene-Vinyl Cyanide Based Copolymer>

Steps for preparing the styrene-vinyl cyanide based copolymer (including the first and second styrene-vinyl cyanide based copolymers) are described below.

First Styrene-Vinyl Cyanide Based Copolymer (A-1)

79 parts by weight of the styrene monomer (abbreviated as "SM"), 21 parts by weight of the vinyl cyanide monomer (abbreviated as "AN"), 0.02 part by weight of benzoyl peroxide (as an initiator), 0.1 part by weight of the dodecyl mercaptan and 7 parts by weight of ethylbenzene were mixed and allowed to conduct a polymerization reaction in a continuous stirring tank reactor (CSTR) with a flow rate of 35 kg/hour continuously fed into the reactor, so as to obtain an emulsion of styrene-vinyl cyanide based copolymer (abbreviated as "AS") of the embodiment. The CSTR has a volume of 40 liters, and equipped with a stirring means. The reaction temperature was 145° C. and the stirring rate of the reactor was 300 rpm. The conversion rate of the polymerization reaction measured at the outlet of the reactor was 55%.

After the polymerization reaction was completed, the copolymer emulsion was heated by a preheater and then subjected to a devolatilization process so as to remove residuals of unreacted monomers and volatile matters such as the solvent. Then, the product polymer was extruded through an extruder and cooled and cut the same to obtain resin pellets of the first styrene-vinyl cyanide based copolymer (A-1). The first styrene-vinyl cyanide based copolymer (A-1) had a weight average molecular weight (Mw) of 131000, and contained 78% of the styrene monomeric units and 22% of the vinyl cyanide monomeric units.

Second Styrene-Vinyl Cyanide Based Copolymer (A-2)

68 parts by weight of the styrene monomer (abbreviated as "SM"), 32 parts by weight of the vinyl cyanide monomer (abbreviated as "AN"), 0.02 part by weight of benzoyl peroxide (as an initiator), 0.1 part by weight of the dodecyl mercaptan and 8 parts by weight of ethylbenzene were mixed and allowed to conduct a polymerization reaction in a continuous stirring tank reactor (CSTR) with a flow rate of 35 kg/hour continuously fed into the reactor, so as to obtain an emulsion of styrene-vinyl cyanide based copolymer (abbreviated as "AS") of the embodiment. The CSTR has a volume of 40 liters, and equipped with a stirring means. The reaction temperature was 145° C. and the stirring rate of the reactor was 300 rpm. The conversion rate of the polymerization reaction measured at the outlet of the reactor was 55%.

After the polymerization reaction was completed, the copolymer emulsion was heated by a preheater and then subjected to a devolatilization process so as to remove residuals of unreacted monomers and volatile matters such as the solvent. Then, the product polymer was extruded through an extruder and cooled and cutted the same to obtain resin pellets of the second styrene-vinyl cyanide based copolymer (A-2). The second styrene-vinyl cyanide based copolymer (A-2) had a weight average molecular weight (Mw) of 86000, and contained 72% of the styrene monomeric units and 28% of the vinyl cyanide monomeric units.

The styrene-vinyl cyanide based copolymer (abbreviated as "AS") of the embodiment can be obtained by mixing the first styrene-vinyl cyanide based copolymer (A-1) with the second styrene-vinyl cyanide based copolymer (A-2). "AN22/AN28" in Table 1 represents the contents of the vinyl cyanide monomeric units of the first and second styrene-vinyl cyanide based copolymer being 22% and 28%, respectively.

<Preparation of Thermoplastic Resin Composition>

Several relative experiments (including comparative examples and embodied examples) are provided below for elaborating the embodiments of the disclosure. Each of the thermoplastic resin composition of the experiments is tested for analyzing the physical properties. The contents of the compositions and the test results of the experiments are listed in Table 1.

Take experimental example 1 for illustration. 25.4 parts by weight of the graft copolymer, 74.6 parts by weight of the styrene-vinyl cyanide based copolymer, 2 parts by weight of N,N'-ethylene bisstearamide (EBA), and 2 parts by weight of pentaerythritoltetrastearate (PETS) and 0.2 part by weight of polysiloxane were blended and stirred in a dry state with a Henschel Mixer, followed by melted and extruded through a biaxial extruder with exhaust vent (available from ZENOX INDUSTRIAL CO., LTD.; Model: ZPT-25) and cooled and cut the same to obtain resin pellets of the thermoplastic resin composition. In the extrusion process, a barrel temperature is in the range of 200° C. to 220° C. and an extrusion die temperature is 220° C. The resin pellets of the thermoplastic resin composition as obtained is a vinyl cyanide based-diene based-styrene based polyblend resin (abbreviated as "ABS resin" herein), wherein the content of rubber (i.e. the diene based rubber) is 16 wt %.

Formations of the thermoplastic resin compositions of the other embodied examples and the comparative examples are similar as the procedures describe above, and are not redundantly repeated.

<Physical Property Tests of Thermoplastic Resin Composition>

Eight tests are conducted to analyze the physical properties of the thermoplastic resin compositions of the comparative examples and embodied examples. The details are provided below.

(1) Impact strength test (Charpy Impact ISO 180): Charpy impact is a single point test that measures a materials resistance to impact from a swinging pendulum. A specimen (with a notch of 2 mm in thickness) having a dimension of 80 mm×10 mm×4 mm is tested at 23° C. (unit of the value: kJ/m$^2$). The larger value of the charpy impact as obtained, the higher the material resistance to the impact. According to the requirements of the product in the application, the value of the impact strength is preferably larger than 20 kJ/m$^2$.

(2) Melt flow index (Melt Flow Rate (MFR), Melt Index (MI), Melt Volume-Flow Rate (MVR)): According to the method described in the standard ISO 1133, a sample of the composition is tested at 220° C. by a loading weight of 10 kg (unit of the value: cm$^3$/10 min).

(3) Elongation (EL): A tensile test measures an extent of a sample specimen to which the specimen elongates to a breaking point. Elongation (unit of the value: %) is determined according to a method described in the standard ISO 527.

(4) Flexural Modulus (FM) and Flexural Strength (FS): Flexural properties such as flexural modulus (FM) and flexural strength (FS) of a sample specimen, having a dimension of 80 mm×10 mm×4 mm, are determined according to the method specified in the standard ISO 178 (units of the values: MPa).

(5) Whitening phenomena during demoulding: During demoulding, a whitening portion (where contacts the ejector pin) appears at the surface of the molded specimen and can be recognized.

Evaluation of whitening phenomena: "○" represents no whitening portion being recognized when a pressure difference between the injection and the full-mold condition reaches a value of 525 kg/m$^2$; "x" represents a whitening portion being recognized when a pressure difference between the injection and the full-mold condition is less than a value of 525 kg/m$^2$. The aforesaid pressure of the full-mold condition denotes a pressure for fully filling the resin in the mold. The aforesaid pressure difference between the injection and the full-mold condition denotes a difference between the injection pressure and the full-mold pressure.

(6) Gate scar: After molding, a gate scar having a size of 3.0±0.1 mm was observed by an optical microscope to determine a gate scar height.

Evaluation of gate scar: "○" represents the gate scar height is smaller than 0.3 mm (<0.3 mm) and is smooth; "Δ" represents the gate scar height is in a range of 0.3 mm-0.5 mm; "x" represents the gate scar height is larger than 0.5 mm (>0.5 mm).

(7) Vicat softening temperature (abbreviated as "SP"): Vicat softening temperature is the determination of the softening point for materials that have no definite melting point. The Vicat softening temperatures (units of the values: ° C.) of the thermoplastic resin compositions of the embodied examples 1-6 and the comparative examples 1-5 were determined according to the method of the standard ISO 306, and it describes the temperature at which a circular indentor with a cross-section of 1 mm$^2$ under a standardized loading of 10 N penetrates 1 mm into the specimen, and the temperature increased at a rate of 50° C. per hour. Also, the Vicat softening temperature is preferably equal to or larger than 101° C. The higher the Vicat softening temperature, the better quality the resin. The higher Vicat softening temperature indicates that the thermoplastic resin compositions has better heat resistance (i.e. better thermal stability).

(8) Rubber content (RC) of diene-based rubber and monomer determination of copolymer: The thermoplastic resin composition of the styrene-vinyl cyanide based copolymer was dissolved in tetrahydrofuran, and the film as formed was measured by a Fourier Transform Infrared (FT-IR) Spectrometer (manufacturer: Nicolet; Model: Nexus470)(units of the values: wt %).

Tests results of the thermoplastic resin compositions of the comparative examples 1-14 and the embodied examples 1-10 are summarized in Table 1. Compared to the thermoplastic resin compositions of the comparative examples 1-14, the thermoplastic resin compositions of the embodied examples 1-10 (i.e. comprising 2-4 parts by weight of the pentaerythritol ester compound and 1-4 parts by weight of the N,N'-ethylene bisstearamide (EBA)) possess several excellent physical properties in balance, including good flexural strength (FS) and good flexural modulus (FM), high impact strength, good tensile strength and breaking strength, as indicated in Table 1. Also, the thermoplastic resin compositions of the embodied examples 1-10 has good demoulding properties (no whitening portion was observed during demoulding), and no gate scar height over 0.3 mm was measured after molding.

The results in Table 1 also indicated that the thermoplastic resin compositions of the comparative examples 1-6, only containing EBA and polysiloxane (silicon oil), show whitening portions during demoulding. Thus, the thermoplastic resin compositions of the comparative examples 1-6 have poor demoulding properties no matter what percentages of EBA were added in the compositions. The results in Table 1 also indicated that the thermoplastic resin compositions of the comparative examples 7-10, only containing PETS and polysiloxane (silicon oil), show high gate scar no matter what percentages of PETS were added in the compositions.

Additionally, although the thermoplastic resin compositions of the comparative examples 11-14 contained PETS, EBA and polysiloxane, the amounts of those elements are not in the embodied ranges, and thus, those compositions could not meet all of the requirements of good physical properties in balance, well demoulding properties and smooth gate scar.

In more specifically, the thermoplastic resin compositions of the comparative examples 1-10 and 12 have poor flexural strength (FS) such as lower than 54.5 MPa, and poor flexural modulus (FM) such as lower than 1900 MPa, which mean that the resin compositions are easy to be deformed by an external force so as to form the whitening portions during demoulding. According to the test results of the comparative examples 9-11 and 14, the melt flow rate (MFR) values are lower than 20 cm$^3$/10 min, which indicate that higher injection pressures are required for processing the thermoplastic resin compositions and consequently form the whitening portions during demoulding. Also, the amounts of PETS, EBA and polysiloxane in the thermoplastic resin composition of the comparative example 13 are not in the embodied ranges, it would be easy to form the whitening portions during demoulding, although the properties of the melt flow rate (MFR), the flexural strength and the flexural modulus achieve a balance.

According to the test results in Table 1, the melt flow rate (MFR) values of the embodied examples 1-10 (ex: 20.15 cm$^3$/10 mm to 33.03 cm$^3$/10 mm) are higher than the MFR values of the comparative examples 9-11 and 14 (ex: all lower than 20 cm$^3$/10 min); therefore, it does not require high injection pressure for processing the thermoplastic resin composition of the embodiment, and consequently prevents the occurrence of the whitening portions during demoulding. Additionally, the test results in Table 1 show that the flexural strengths (ex: 54.6 MPa to 60.7 MPa) and the flexural modulus (ex: 1925 MPa to 2209 MPa) of the thermoplastic resin compositions of the embodied examples 1-10 are larger than those values of the comparative examples 1-10 and 12 (ex: the flexural strengths are not over 20 54.3 MPa and the flexural modulus are lower than 1900 Mpa); therefore, the thermoplastic resin compositions of the embodiment are not easy to be deformed by an external force, so that it is completely no whitening portions formed during demoulding. In general, the thermoplastic resin composition with particular combination of the related elements in the contents of the embodiment not only achieves the physical properties (ex: good flexural strength, good flexural modulus, high impact strength, good tensile strength and good breaking strength) in a balance that the conventional cannot achieve, but also have several advantages during resin processing such as good demoulding properties (i.e. no whitening portion was observed during demoulding) and smooth gate scar after molding. The yield of resin product using the thermoplastic resin composition of the embodiment can be significantly improved.

Moreover, the results in Table 1 also indicated that the thermoplastic resin compositions of the embodied examples 5-7 have the moderate MFR values (ex: 24.26 cm³/10 min to 26.65 cm³/10 min), the moderate flexural modulus (ex: 1967 MPa to 2054 MPa) and the lower elongation rate (ex: 20% to 22%), which are suitable for making the products with excellent properties. The product made by the thermoplastic resin composition with larger flexural modulus (ex: larger than 2054 MPa) would be too hard and easy to be scratched for leaving the unwanted marks on the surfaces of the product. The thermoplastic resin composition with high elongation rate (such as higher than 27%) may suffer from the deformation during processing. Compared to other embodied examples, the thermoplastic resin compositions of the embodied examples 5-7 having the lower elongation rates are able to prevent the deformation during processing, and also make the products with better gloss. According to one embodiment, the thermoplastic resin composition with a flexural modulus ranged from 1945 MPa to 2080 MPa is suitable for making a product with a moderate hardness and not easy to be scratched. It is, of course, known to people skilled in the art that the proportions of the related elements and the values of physical properties are provided for exemplification, and not provided for limiting the elements in use and the physical properties of each element of the embodiment during applications. In the practical applications, the related elements in the thermoplastic resin composition and the proportions thereof can be selected from the contents of the embodied composition as provided above and determined according to the requirements of physical properties of the application product for obtaining the product with physical properties in balance.

TABLE 1

(In Table 1, "Com. Exam." is the abbreviation of the comparative example and "Exam." is the abbreviation of the example.)

| Sets | Unit | Com. Exam. 1 | Com. Exam. 2 | Com. Exam. 3 | Com. Exam. 4 | Com. Exam. 5 | Com. Exam. 6 | Com. Exam. 7 | Com. Exam. 8 |
|---|---|---|---|---|---|---|---|---|---|
| AS | wt % | 66.67 | 66.67 | 66.67 | 66.67 | 66.67 | 66.67 | 66.67 | 66.67 |
| AN22/AN28 | — | 5/5 | 8/2 | 8/2 | 8/2 | 5/5 | 8/2 | 5/5 | 5/5 |
| EBA | parts by weight | 2 | 3 | 3 | 4 | 4.5 | 8 | 0 | 0 |
| PETS | parts by weight | 0 | 0 | 0 | 0 | 0 | 0 | 2 | 3 |
| EBA + PETS | — | 2 | 3 | 3 | 4 | 4.5 | 8 | 2 | 3 |
| EBA/(EBA + PETS) | — | 1 | 1 | 1 | 1 | 1 | 1 | NA | NA |
| PETS/(EBA + PETS) | — | NA | NA | NA | NA | NA | NA | 1 | 1 |
| RC | wt % | 21 | 21 | 21 | 21 | 21 | 21 | 21 | 21 |
| Silicon oil | ppm | 2000 | 2000 | 4000.00 | 2000 | 2000 | 2000 | 4000 | 4000 |
| Melt flow index (MVR-220° C. × 10 kg/10 min) | cm³/10 min | 21.2 | 23.96 | 24.59 | 29.15 | 32.2 | 38.2 | 24.21 | 22.44 |
| Impact strength (Charpy, Notched) | kJ/m² | 24.4 | 24 | 24.8 | 24.5 | 25.2 | 25.2 | 23.9 | 25.9 |
| EL rate (50 mm/min) | % | 22 | 19 | 13 | 33 | 30 | 27 | 20 | 15 |
| Vicat softening temperature | ° C. | 106.7 | 103.2 | 102.6 | 102.9 | 102.6 | 100.2 | 105.9 | 106.2 |
| Flexural strength (FS, 2 mm/min) | MPa | 53.4 | 54.2 | 53.1 | 54.2 | 53.3 | 54.3 | 54 | 54.2 |
| Flexural modulus (FM, 2 mm/min) | MPa | 1872 | 1883 | 1856 | 1860 | 1857 | 1874 | 1883 | 1841 |

TABLE 1-continued (In Table 1, "Com. Exam." is the abbreviation of the comparative example and "Exam." is the abbreviation of the example.)

| | | | | | | | | | |
|---|---|---|---|---|---|---|---|---|---|
| Whitening during demoulding (any whitening portion shown is evaluated as "x") | — | x | x | x | x | x | x | ○ | ○ |
| Gate scar (○: <0.3 mm; Δ: 0.3~0.5 mm x: >0.5 mm) | — | x | ○ | Δ | ○ | ○ | ○ | x | x |

| Sets | Unit | Com. Exam. 9 | Com. Exam. 10 | Com. Exam. 11 | Com. Exam. 12 | Com. Exam. 13 | Com. Exam. 14 | Exam. 1 | Exam. 2 |
|---|---|---|---|---|---|---|---|---|---|
| AS | wt % | 66.67 | 66.67 | 68.25 | 68.25 | 68.25 | 68.25 | 74.6 | 73.02 |
| AN22/AN28 | — | 5/5 | 5/5 | 5/5 | 8/2 | 8/2 | 5/5 | 8/2 | 8/2 |
| EBA | parts by weight | 0 | 0 | 0.5 | 5 | 4 | 1 | 2 | 2 |
| PETS | parts by weight | 4 | 8 | 3 | 4 | 1 | 5 | 2 | 2 |
| EBA + PETS | — | 4 | 8 | 3.5 | 9 | 5 | 6 | 4 | 4 |
| EBA/(EBA + PETS) | — | NA | NA | 0.14 | 0.56 | 0.80 | 0.17 | 0.5 | 0.5 |
| PETS/(EBA + PETS) | — | 1 | 1 | 0.86 | 0.44 | 0.20 | 0.83 | 0.5 | 0.5 |
| RC | wt % | 21 | 21 | 20 | 20 | 20 | 20 | 16 | 17 |
| Silicon oil | ppm | 2000 | 4000 | 2000 | 2000 | 3000 | 4000 | 2000 | 4000 |
| Melt flow index (MVR-220° C. × 10 kg/10 min) | cm$^3$/10 min | 19.52 | 15.74 | 19.61 | 24.9 | 31.65 | 13.78 | 27.53 | 28.1 |
| Impact strength (Charpy, Notched) | kJ/m$^2$ | 26.3 | 25 | 24.7 | 24.3 | 24 | 25.5 | 22.6 | 22.9 |
| EL rate (50 mm/min) | % | 12 | 30 | 22 | 28 | 20 | 15 | 30.3 | 27.9 |
| Vicat softening temperature | ° C. | 105.9 | 106.2 | 106.1 | 102.9 | 102.9 | 105.7 | 103.5 | 103.7 |
| Flexural strength (FS, 2 mm/min) | MPa | 53.1 | 54.2 | 56.5 | 54.3 | 55.3 | 56.7 | 60.7 | 57.9 |
| Flexural modulus (FM, 2 mm/min) | MPa | 1832 | 1855 | 1942 | 1892 | 1939 | 1956 | 2209 | 2119 |
| Whitening during demoulding (any whitening portion shown is evaluated as "x") | — | ○ | ○ | ○ | x | x | ○ | ○ | ○ |
| Gate scar (○: <0.3 mm; Δ: 0.3~0.5 mm x: >0.5 mm) | — | x | x | x | Δ | ○ | x | ○ | ○ |

| Sets | Unit | Exam. 3 | Exam. 4 | Exam. 5 | Exam. 6 | Exam. 7 | Exam. 8 | Exam. 9 | Exam. 10 |
|---|---|---|---|---|---|---|---|---|---|
| AS | wt % | 69.84 | 69.84 | 69.84 | 69.84 | 66.67 | 69.84 | 71.43 | 73.02 |
| AN22/AN28 | — | 5/5 | 5/5 | 8/2 | 8/2 | 8/2 | 5/5 | 8/2 | 8/2 |
| EBA | parts by weight | 1 | 2 | 2 | 2 | 2 | 1 | 4 | 4 |
| PETS | parts by weight | 3 | 2 | 2 | 2 | 2 | 4 | 2 | 4 |
| EBA + PETS | — | 4 | 4 | 4 | 4 | 4 | 5 | 6 | 8 |
| EBA/(EBA + PETS) | — | 0.25 | 0.5 | 0.5 | 0.5 | 0.5 | 0.2 | 0.66667 | 0.5 |

TABLE 1-continued (In Table 1, "Com. Exam." is the abbreviation of the comparative example and "Exam." is the abbreviation of the example.)

| | | | | | | | | | | |
|---|---|---|---|---|---|---|---|---|---|---|
| PETS/(EBA + PETS) | — | 0.75 | 0.5 | 0.5 | 0.5 | 0.5 | 0.8 | 0.33333 | 0.5 | |
| RC | wt % | 19 | 19 | 19 | 19 | 21 | 19 | 18 | 17 | |
| Silicon oil | ppm | 4000 | 2000 | 3000 | 4000 | 500 | 4000 | 4000 | 1000 | |
| Melt flow index (MVR-220° C. × 10 kg/10 min) | cm³/10 min | 22.46 | 23.94 | 24.26 | 26.65 | 26.21 | 20.15 | 33.03 | 30.47 | |
| Impact strength (Charpy, Notched) | kJ/m² | 27.3 | 26.4 | 26.2 | 26.1 | 27.7 | 28 | 24 | 23.3 | |
| EL rate (50 mm/min) | % | 27.2 | 21 | 21 | 22 | 20 | 27.3 | 29 | 28.3 | |
| Vicat softening temperature | ° C. | 104.4 | 103.3 | 103.9 | 103.6 | 103.9 | 105.7 | 102.9 | 102.9 | |
| Flexural strength (FS, 2 mm/min) | MPa | 54.8 | 58.5 | 58.2 | 58.2 | 57 | 58 | 58.8 | 57.3 | |
| Flexural modulus (FM, 2 mm/min) | MPa | 1986 | 2044 | 2054 | 2045 | 1967 | 1925 | 2156 | 2092 | |
| Whitening during demoulding (any whitening portion shown is evaluated as "x") | | ○ | ○ | ○ | ○ | ○ | ○ | ○ | ○ | ○ |
| Gate scar (○: <0.3 mm; Δ:0.3~0.5 mm x: >0.5 mm) | | ○ | ○ | ○ | ○ | ○ | ○ | ○ | ○ | ○ |

"AS": styrene-vinyl cyanide based copolymer;

"AN": vinyl cyanide monomeric units ("AN22/AN28" in Table 1 represents the contents of the vinyl cyanide monomeric units of the first and second styrene-vinyl cyanide based copolymer being 22% and 28%, respectively);

"EBA": N,N'-ethylene bisstearamide (available from PT. CMS CHEMICAL INDONESIA; Model: P-200);

PETS: pentaerythritoltetrastearate (available from Patech Fine Chemicals Co., Ltd.; Model: PASFLOW-7401); and RC: rubber content of diene-based rubber.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A thermoplastic resin composition, comprising:
   a rubber-modified polystyrene-based resin;
   a pentaerythritol ester compound; and
   a fatty acid amide compound,
   wherein a total content of the pentaerythritol ester compound and the fatty acid amide compound is ranging from 4 parts to 8 parts by weight based on 100 parts by weight of the rubber-modified polystyrene-based resin, and a ratio of a content of the pentaerythritol ester compound to the total content of the pentaerythritol ester compound and the fatty acid amide compound is in a range of larger than 0.2 to less than 0.83.

2. The thermoplastic resin composition according to claim 1, further comprising polysiloxane with 0.05 to 0.4 parts by weight, based on 100 parts by weight of the rubber-modified polystyrene-based resin.

3. The thermoplastic resin composition according to claim 1, wherein the rubber-modified polystyrene-based resin comprises:
   10 wt % to 30 wt % of graft copolymer, comprising diene-based rubber with grafted chains of styrene based monomeric units and vinyl cyanide based monomeric units; and
   70 wt % to 90 wt % of styrene-vinyl cyanide based copolymer, comprising at least a styrene based monomeric unit and at least a vinyl cyanide based monomeric unit.

4. The thermoplastic resin composition according to claim 3, wherein the styrene-vinyl cyanide based copolymer comprises 20 wt % to 50 wt % of first styrene-vinyl cyanide based copolymer and 50 wt % to 80 wt % of second styrene-vinyl cyanide based copolymer, wherein a content of vinyl cyanide based monomeric unit of said first styrene-vinyl cyanide based copolymer is smaller than a content of vinyl cyanide based monomeric unit of said second styrene-vinyl cyanide based copolymer.

5. The thermoplastic resin composition according to claim 3, wherein the graft copolymer comprises first graft copolymer having particle sizes ranging from 0.05 µm to 0.15 µm, and second graft copolymer having particle sizes ranging from 0.25 µm to 0.4 µm.

6. The thermoplastic resin composition according to claim 3, wherein the styrene-vinyl cyanide based copolymer comprises 67 wt % to 80 wt % of said styrene based monomeric unit, 20 wt % to 33 wt % of said vinyl cyanide based monomeric unit, and 0 wt % to 13 wt % of other copolymerizable vinyl based monomeric unit.

7. The thermoplastic resin composition according to claim 1, wherein the rubber-modified polystyrene-based resin comprises:
- 16 wt % to 21 wt % graft copolymer, comprising diene-based rubber with grafted chains of styrene based monomeric units and vinyl cyanide based monomeric units; and
- 79 wt % to 84 wt % of styrene-vinyl cyanide based copolymer, comprising at least a styrene based monomeric unit and at least a vinyl cyanide based monomeric unit.

8. The thermoplastic resin composition according to claim 7, wherein the styrene-vinyl cyanide based copolymer comprises 20 wt % to 50 wt % of first styrene-vinyl cyanide based copolymer and 50 wt % to 80 wt % of second styrene-vinyl cyanide based copolymer, wherein a content of vinyl cyanide based monomeric unit of said first styrene-vinyl cyanide based copolymer is smaller than a content of vinyl cyanide based monomeric unit of said second styrene-vinyl cyanide based copolymer.

9. The thermoplastic resin composition according to claim 7, wherein the graft copolymer comprises first graft copolymer having particle sizes ranging from 0.05 µm to 0.15 µm, and second graft copolymer having particle sizes ranging from 0.25 µm to 0.4 µm.

10. The thermoplastic resin composition according to claim 7, wherein the styrene-vinyl cyanide based copolymer comprises 67 wt % to 80 wt % of said styrene based monomeric unit, 20 wt % to 33 wt % of said vinyl cyanide based monomeric unit, and 0 wt % to 13 wt % of other copolymerizable vinyl based monomeric unit.

11. The thermoplastic resin composition according to claim 1, wherein the content of the pentaerythritol ester compound is ranging from 2 parts to 4 parts by weight and a content of the fatty acid amide compound is ranging from 1 part to 4 parts by weight, based on 100 parts by weight of the rubber-modified polystyrene-based resin.

12. The thermoplastic resin composition according to claim 1, wherein the pentaerythritol ester compound is selected from at least one of the group consisting of pentaerythritoltristearate, pentaerythritoladipate stearate, pentaerythritol succinate stearate, pentaerythritoltetrastearate and pentaerythritoltetralaurate.

13. The thermoplastic resin composition according to claim 1, wherein the fatty acid amide compound is selected from at least one of the group consisting of stearamide, oleamide, erucamide, N,N'-ethylene bisstearamide, N,N'-Methylenebisoctadecanamide and N,N'-ethylenebisoleamide.

14. The thermoplastic resin composition according to claim 1, having a melt volume-flow rate (MVR) ranging from 20.15 $cm^3$/10 min to 33.03 $cm^3$/10 min which is tested at 220° C. with a constant load of 10 kg.

15. The thermoplastic resin composition according to claim 1, having a flexural strength (FS) ranging from 54.6 MPa to 60.7 MPa.

16. The thermoplastic resin composition according to claim 1, having a flexural modulus (FM) ranging from 1945 MPa to 2080 MPa.

17. A product, formed from the thermoplastic resin composition according to claim 1.

* * * * *